United States Patent
Ikeda et al.

(10) Patent No.: US 10,748,028 B2
(45) Date of Patent: Aug. 18, 2020

(54) EXTRANEOUS-MATTER DETECTING APPARATUS AND EXTRANEOUS-MATTER DETECTING METHOD

(71) Applicant: DENSO TEN Limited, Kobe-shi, Hyogo (JP)

(72) Inventors: Nobuhisa Ikeda, Kobe (JP); Nobunori Asayama, Kobe (JP); Daisuke Yamamoto, Kobe (JP); Takashi Kono, Kobe (JP)

(73) Assignee: DENSO TEN LIMITED, Kobe (JP)

( * ) Notice: Subject to any disclaimer, the term of this patent is extended or adjusted under 35 U.S.C. 154(b) by 197 days.

(21) Appl. No.: 15/920,951

(22) Filed: Mar. 14, 2018

(65) Prior Publication Data
US 2018/0314907 A1    Nov. 1, 2018

(30) Foreign Application Priority Data
Apr. 28, 2017    (JP) .................. 2017-090629

(51) Int. Cl.
  *G06K 9/46*    (2006.01)
  *G06K 9/32*    (2006.01)
  *G06K 9/00*    (2006.01)

(52) U.S. Cl.
  CPC ........ *G06K 9/4647* (2013.01); *G06K 9/00791* (2013.01); *G06K 9/3233* (2013.01); *G06K 9/4661* (2013.01)

(58) Field of Classification Search
  CPC ............. G06K 9/4647; G06K 9/00791; G06K 9/3233; G06K 9/4661
  See application file for complete search history.

(56) References Cited

U.S. PATENT DOCUMENTS

| | | | |
|---|---|---|---|
| 8,964,030 B2* | 2/2015 | Itoh .................... | G06K 9/00771 348/143 |
| 9,384,532 B2* | 7/2016 | Hong ..................... | G06T 5/002 |
| 9,432,643 B2* | 8/2016 | Hayashi ................. | G06T 5/003 |

(Continued)

FOREIGN PATENT DOCUMENTS

| | | |
|---|---|---|
| JP | 2001-111989 | 4/2001 |
| JP | 2005-084959 A | 3/2005 |

(Continued)

*Primary Examiner* — Kim Y Vu
*Assistant Examiner* — Molly Delaney
(74) *Attorney, Agent, or Firm* — Oliff PLC

(57) ABSTRACT

An extraneous-matter detecting apparatus including a dividing unit that divides a captured image into a plurality of regions. The captured image is output from an image capturing device; a computing unit detecting luminance values of pixels included in each of the regions divided by the dividing unit, and computes, for each of target regions, an average value or a standard deviation of luminance values of the detected luminance values. The corresponding target region corresponds to the one or more regions; and a detection unit that extracts the target regions having the average values or the standard deviations of the luminance values computed by the computing unit, which are within a predetermined range, and detects, when the extracted target regions are adjacent to each other, the adjacent target regions as an extraneous-matter region. The extraneous-matter region is a region of the image capturing device to which an extraneous matter is adhered.

12 Claims, 8 Drawing Sheets

(56) References Cited

U.S. PATENT DOCUMENTS

| | | | |
|---|---|---|---|
| 9,804,386 B2* | 10/2017 | Hayakawa | B60S 1/56 |
| 10,127,635 B2* | 11/2018 | Wu | G06T 5/20 |
| 10,157,456 B2* | 12/2018 | Higo | G06T 7/0004 |
| 2002/0164074 A1* | 11/2002 | Matsugu | G06K 9/48 |
| | | | 382/173 |
| 2005/0035926 A1* | 2/2005 | Takenaga | B60S 1/0818 |
| | | | 345/8 |
| 2010/0098335 A1* | 4/2010 | Yamagishi | G08B 17/125 |
| | | | 382/168 |
| 2012/0288146 A1* | 11/2012 | Kido | G06K 9/00805 |
| | | | 382/103 |
| 2013/0188866 A1* | 7/2013 | Obrador | G06T 7/0002 |
| | | | 382/165 |
| 2014/0010408 A1* | 1/2014 | Irie | G06K 9/00791 |
| | | | 382/103 |
| 2014/0029008 A1* | 1/2014 | Hirai | G01N 21/552 |
| | | | 356/445 |
| 2014/0086487 A1* | 3/2014 | Hao | G06K 9/00664 |
| | | | 382/173 |
| 2015/0177512 A1* | 6/2015 | Hayakawa | B60S 1/56 |
| | | | 348/148 |
| 2015/0195496 A1* | 7/2015 | Hayakawa | B60R 1/00 |
| | | | 348/118 |
| 2015/0201120 A1* | 7/2015 | Irie | H04N 5/2171 |
| | | | 348/148 |
| 2016/0307054 A1* | 10/2016 | Takemura | G06K 9/00791 |
| 2016/0364620 A1* | 12/2016 | Akiyama | H04N 7/188 |
| 2017/0345131 A1* | 11/2017 | Wu | G06T 5/20 |
| 2019/0174029 A1* | 6/2019 | Mandai | B60R 1/00 |

FOREIGN PATENT DOCUMENTS

| | | |
|---|---|---|
| JP | 2014-030188 A | 2/2014 |
| JP | 2016-103787 A | 6/2016 |

\* cited by examiner

| ITEM | EACH REGION | OVERALL |
|---|---|---|
| LUMINANCE-AVERAGE UPPER LIMIT | 220 | 180 |
| LUMINANCE-AVERAGE LOWER LIMIT | 60 | 90 |
| STANDARD-DEVIATION UPPER LIMIT | 100 | 100 |
| STANDARD-DEVIATION LOWER LIMIT | 20 | 30 |

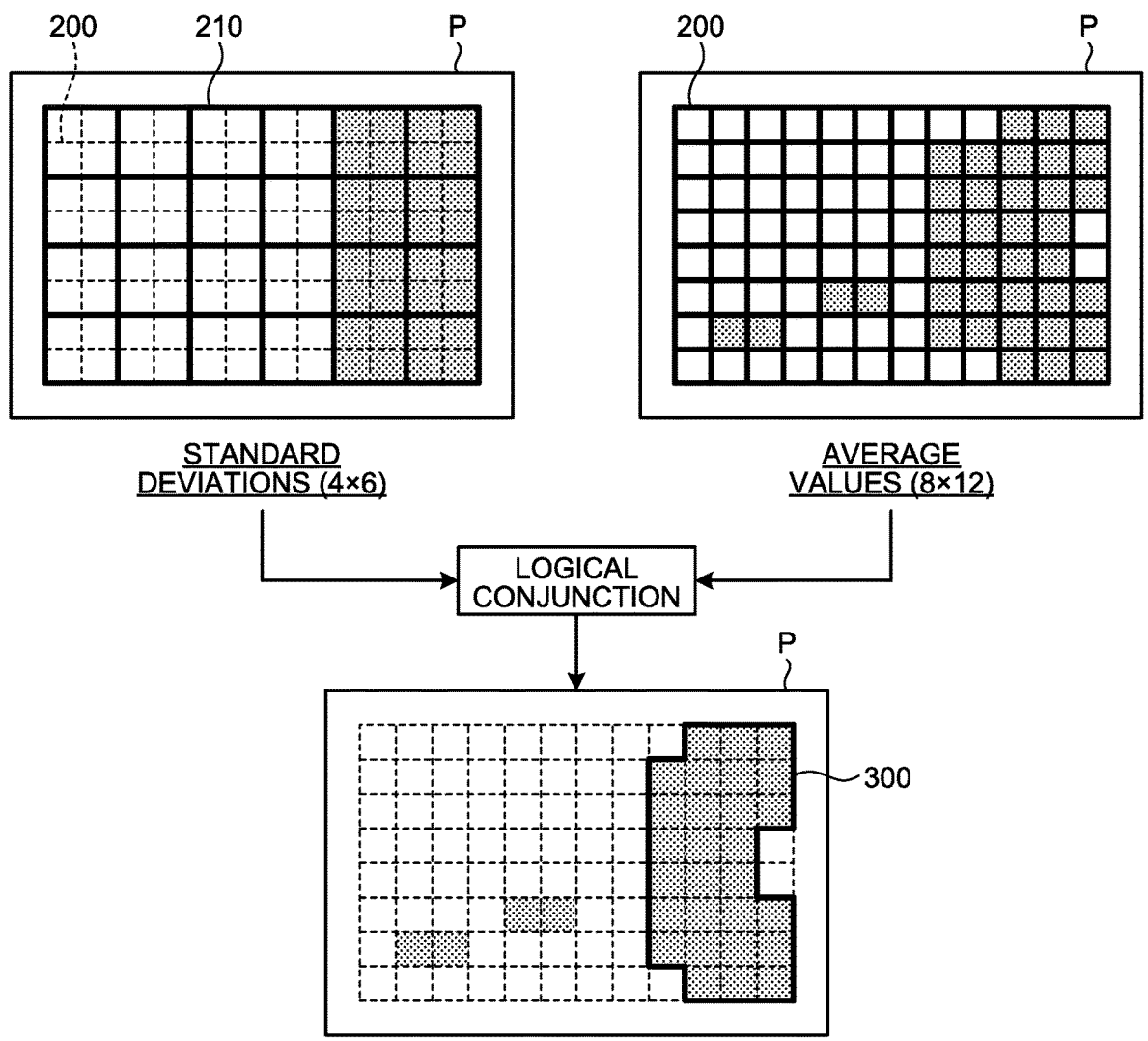

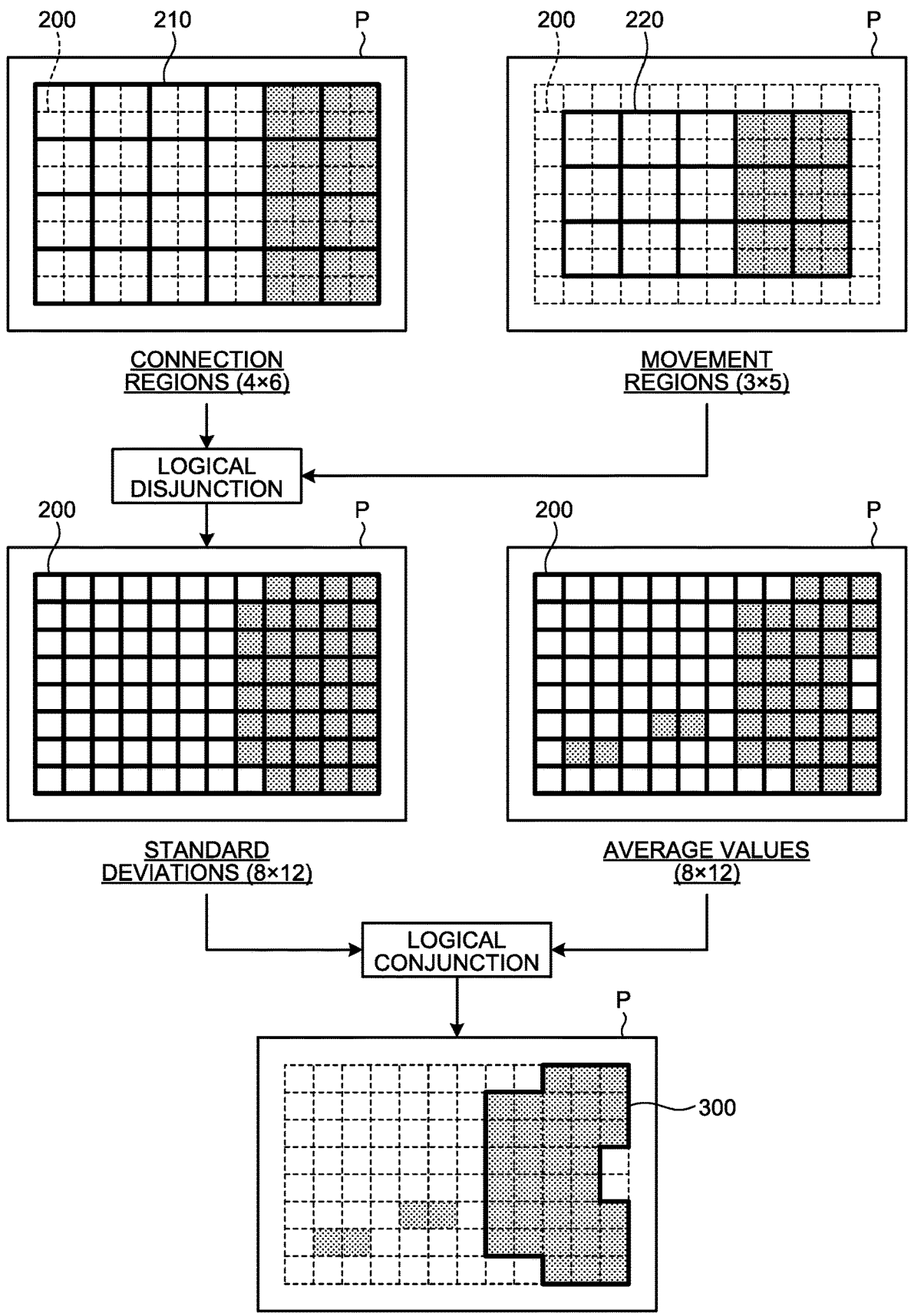

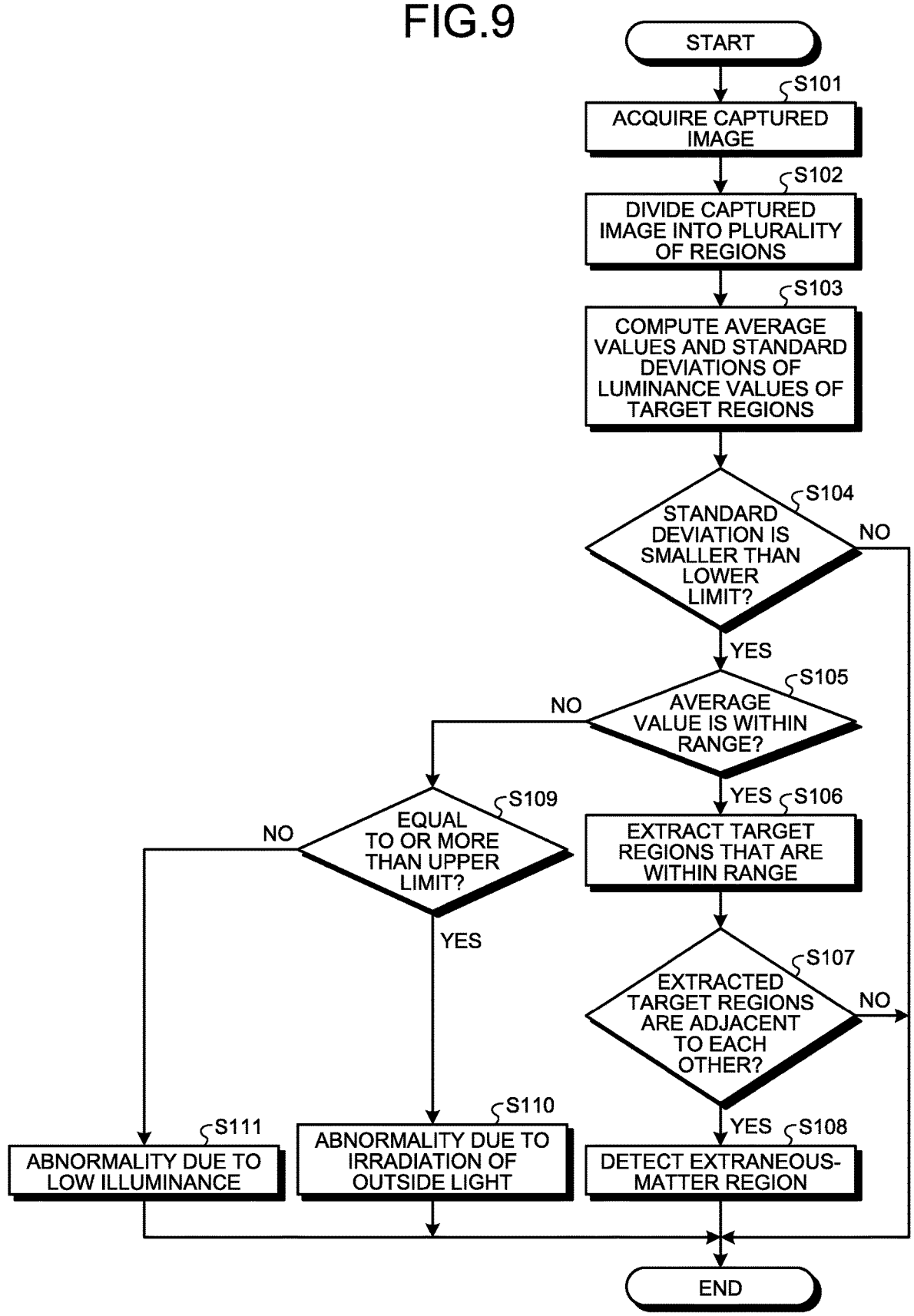

EXTRANEOUS-MATTER DETECTING APPARATUS AND EXTRANEOUS-MATTER DETECTING METHOD

CROSS-REFERENCE TO RELATED APPLICATION

This application is based upon and claims the benefit of priority of the prior Japanese Patent Application No. 2017-090629, filed on Apr. 28, 2017, the entire contents of which are incorporated herein by reference.

FIELD

The embodiment discussed herein is directed to an extraneous-matter detecting apparatus and an extraneous-matter detecting method.

BACKGROUND

Conventionally, there is known an extraneous-matter detecting apparatus that detects an extraneous matter and the like adhered to a lens on the basis of an image captured by a camera arranged at the outside of a vehicle, for example. There is proposed a technology of the extraneous-matter detecting apparatus for detecting an extraneous-matter region that indicates adhesion of the extraneous matter on the basis of a luminance distribution of the captured image, for example (see Japanese Laid-open Patent Publication No. 2005-084959, for example).

However, in the conventional technology, there exists a case where, for example, an abnormality in the illuminance of lights being made incident on a camera, such as incidence in a backlight state, and the extraneous-matter region are not able to be individually detected, in some cases. Therefore, the conventional technology has room for improvement in improving the detection accuracy of an extraneous matter.

SUMMARY

An extraneous-matter detecting apparatus according to an embodiment includes a dividing unit, a computing unit, and a detection unit. The dividing unit divides a captured image into a plurality of regions. The captured image is output from an image capturing device. The computing unit detects luminance values of pixels included in each of the regions divided by the dividing unit, and computes, for each of target regions, an average value or a standard deviation of luminance values of the detected luminance values. The corresponding target region corresponds to the one or more regions. The detection unit extracts the target regions having the average values or the standard deviations of the luminance values computed by the computing unit, which are within a predetermined range, and detects, when the extracted target regions are adjacent to each other, the adjacent target regions as an extraneous-matter region. The extraneous-matter region is a region of the image capturing device to which an extraneous matter is adhered.

BRIEF DESCRIPTION OF DRAWINGS

A more complete appreciation of the present disclosure and many of the attendant advantages thereof will be readily obtained as the same becomes better understood by reference to the following detailed description when considered in connection with the accompanying drawings, wherein:

FIG. 7 is a diagram illustrating processing details of the detection unit according to the embodiment;

FIG. 8 is a diagram illustrating processing details of the detection unit according to the embodiment; and FIG. 9 is a flowchart illustrating a procedure for detection processes to be executed by the extraneous-matter detecting apparatus according to the embodiment.

DESCRIPTION OF EMBODIMENT

Hereinafter, an exemplary embodiment of an extraneous-matter detecting apparatus and an extraneous-matter detecting method disclosed in the present application will be described in detail with reference to the accompanying drawings. Moreover, it is not intended that the present disclosure be limited to the embodiment described below.

Figure 1:
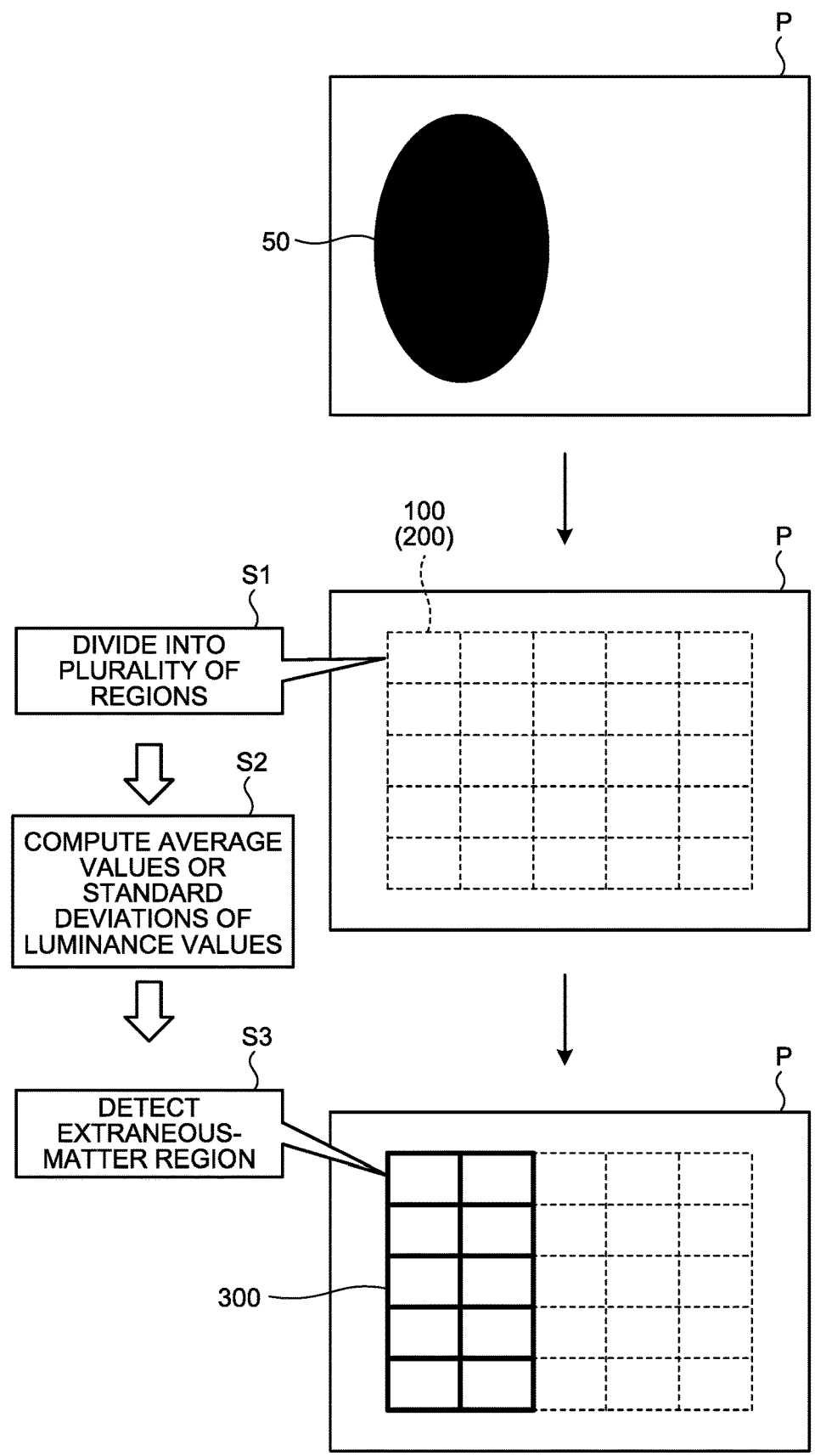
FIG. 1 is a diagram illustrating an outline of an extraneous-matter detecting method according to an embodiment.

First, an outline of the extraneous-matter detecting method according to the embodiment will be explained with reference to FIG. 1. In FIG. 1, a captured image P including an extraneous-matter region 300 is illustrated. The extraneous-matter region 300 is a region indicating an extraneous matter adhered to, for example, a lens of a camera that is an image capturing device 10 (see FIG. 2). As this extraneous matter, there exist, for example, a snowflake, muddy water, a blur on the lens caused by freeze, etc.

Meanwhile, a conventional extraneous-matter detecting method will be explained. In the conventional extraneous-matter detecting method, when the extraneous-matter region was detected, a region, in which a luminance distribution satisfied a predetermined condition, in a whole of the captured image was detected as the extraneous-matter region, for example. Thus, there existed a fear that the region detected as the extraneous-matter region was not able to be individually detected as a region to which an extraneous matter actually adhered or a region caused by an abnormality in the illuminance of lights being made incident on the camera such as incidence in a backlight state, for example. In this manner, the conventional technology has room for improvement in improving the detection accuracy of the extraneous matter.

Therefore, in the extraneous-matter detecting method according to the embodiment, an extraneous-matter region is detected when a plurality of regions continues, each of which has an average value or a standard deviation, of its luminance values, within a predetermined range. Specifically, in the extraneous-matter detecting method according to the embodiment, first, the captured image P, which is output from the image capturing device 10, is divided into a plurality of regions 100 (Step S1).

Next, in the extraneous-matter detecting method according to the embodiment, luminance values of pixels included in each of the divided regions 100 are detected, and an average value or a standard deviation of luminance values of a target region 200 corresponding to the corresponding region 100 is computed (Step S2). In FIG. 1, the one region 100 corresponds to the one target region 200, for example, the plurality of regions 100 may correspond to the one target region 200.

Next, in the extraneous-matter detecting method according to the embodiment, the target regions 200, each of which has the computed average value or the computed standard deviation of the luminance values within a predetermined range, are extracted, when the extracted target regions 200 are adjacent to each other, the continuous target regions 200 are detected as the extraneous-matter region 300 (Step S3). For example, in FIG. 1, the extraneous-matter region 300 includes the ten target regions 200.

In other words, in the extraneous-matter detecting method according to the embodiment, the continuous target regions 200 are detected, and thus the extraneous-matter region 300 whose blurred region is comparatively broad and a locally narrow region caused by incidence in a backlight state and the like are able to be individually detected from the overall captured image P. In other words, by employing the extraneous-matter detecting method according to the embodiment, it is possible to improve detection accuracy of an extraneous matter.

In the extraneous-matter detecting method according to the embodiment, detection of an abnormality in the illuminance of lights being made incident on the captured image P in a backlight state, nighttime, etc. will be mentioned later with reference to FIG. 6.

In the extraneous-matter detecting method according to the embodiment, when an AND condition is satisfied between the luminance average value and the luminance standard deviation, the extraneous-matter region 300 is detected. This point will be mentioned later with reference to FIG. 7.

In the extraneous-matter detecting method according to the embodiment, the extraneous-matter region 300 is detected by using a region obtained by extraction using an OR condition between the region for computing a standard deviation and a region slightly shifted from the region for computing the standard deviation. This point will be mentioned later with reference to FIG. 8.

Figure 2:
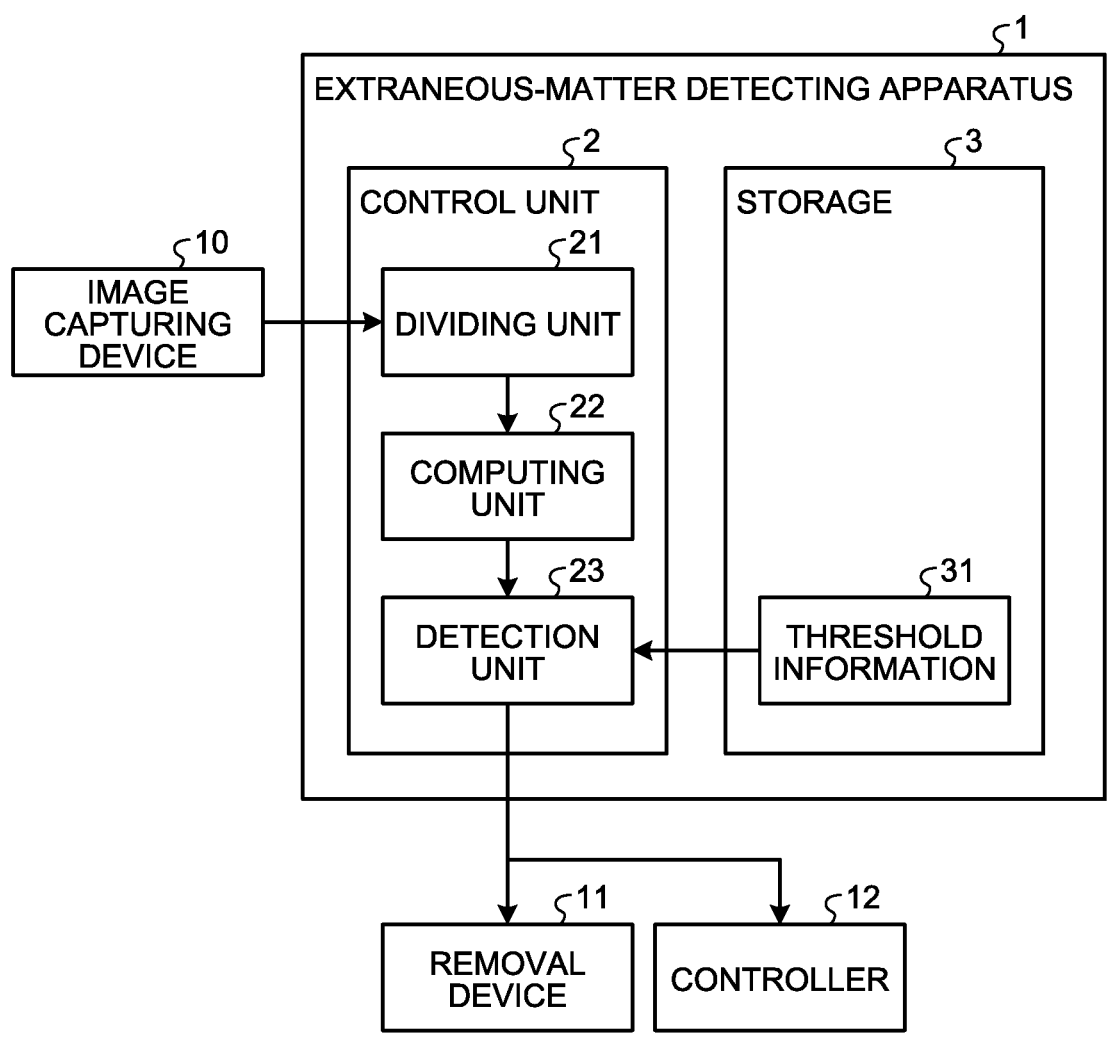
FIG. 2 is a block diagram illustrating a configuration of an extraneous-matter detecting apparatus according to the embodiment.

Next, details of a configuration of an extraneous-matter detecting apparatus 1 according to the embodiment will be explained with reference to FIG. 2. FIG. 2 is a block diagram illustrating the configuration of the extraneous-matter detecting apparatus 1 according to the embodiment. As depicted in FIG. 2, the extraneous-matter detecting apparatus 1 according to the embodiment is connected to the image capturing device 10, a removal device 11, and a controller 12, for example.

The image capturing device 10 is an on-vehicle camera that includes image capturing elements such as a Charge Coupled Device (CCD) image sensor and a Complementary Metal Oxide Semiconductor (CMOS) image sensor. The image capturing device 10 is attached to the outside of a vehicle and captures the periphery of the vehicle. The number of the image capturing devices 10 may be one or more.

The removal device 11 removes an extraneous matter adhered to a lens of the image capturing device 10 on the basis of a detection result of the extraneous-matter detecting apparatus 1. The removal device 11 may eject compressed air or windshield washer fluid toward the lens of the image capturing device 10, or cause a camera wiper to wipe the lens of the image capturing device 10, for example.

The controller 12 controls a control system provided in the vehicle on the basis of a detection result of the extraneous-matter detecting apparatus 1, for example. When the extraneous-matter detecting apparatus 1 detects an extraneous matter, the controller 12 stops functions of a detection system for detecting an obstacle etc. in the periphery of the vehicle and the like, or informs a driver of removal of the extraneous matter, for example.

When the extraneous-matter detecting apparatus 1 detects a region of a high luminance abnormality due to irradiation of outside light or an abnormality due to a low illuminance, the controller 12 controls the above control system in a region other than the detected region or informs a driver of the detected region of the abnormality.

The extraneous-matter detecting apparatus 1 according to the embodiment includes a control unit 2 and a storage 3. The control unit 2 includes a dividing unit 21, a computing unit 22, and a detection unit 23. The storage 3 stores threshold information 31.

The extraneous-matter detecting apparatus 1 includes: a computer including, for example, a Central Processing Unit (CPU), a Read Only Memory (ROM), a Random Access Memory (RAM), a Hard Disk Drive (HDD), an input/output port, and the like; and various circuits.

The CPU of the computer reads and executes a program stored in the ROM so as to functions as the dividing unit 21, the computing unit 22, and the detection unit 23 of the control unit 2, for example.

At least one or all of the dividing unit 21, the computing unit 22, and the detection unit 23 of the control unit 2 may be constituted of the hardware such as an Application Specific Integrated Circuit (ASIC) and a Field Programmable Gate Array (FPGA).

The storage 3 corresponds to the RAM or the HDD, for example. The RAM and the HDD are able to store the threshold information 31, information on various programs, etc. The extraneous-matter detecting apparatus 1 may acquire the above programs and various kinds of information via another computer or a portable recording medium that is connected by a wired or wireless network.

The threshold information 31 is information including thresholds that are references when the detection unit 23 to be mentioned later detects an extraneous matter. The threshold information 31 will be explained with reference to FIG. 3.

Figures 3, 4:
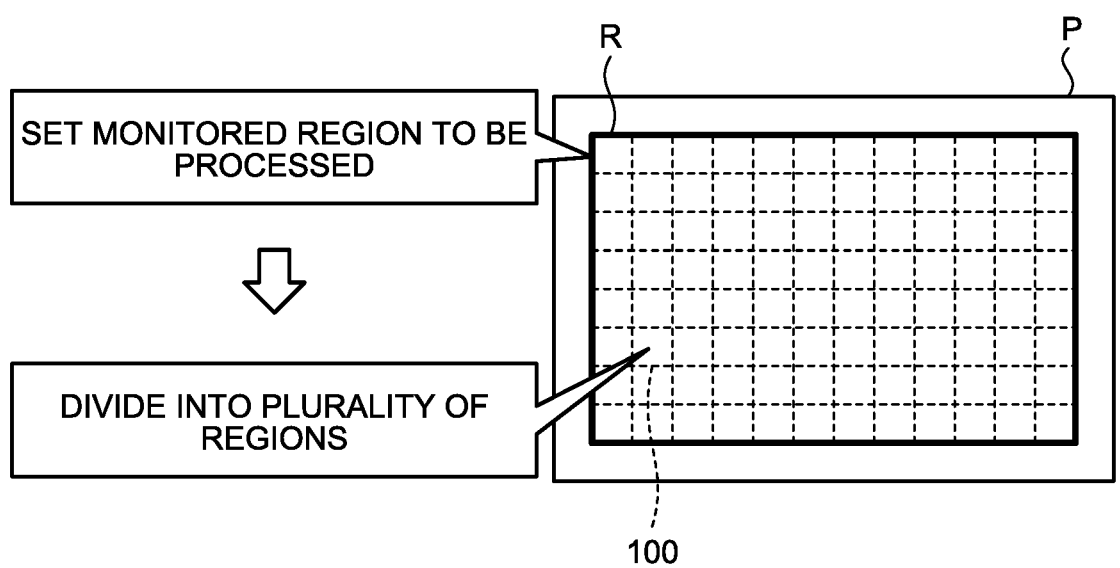
FIG. 3 is a diagram illustrating threshold information according to the embodiment.
FIG. 4 is a diagram illustrating processing details of a dividing unit according to the embodiment.

FIG. 3 is a diagram illustrating the threshold information 31 according to the embodiment. In FIG. 3, one example of thresholds is depicted, and each of the numeric values is not limited thereto. As depicted in FIG. 3, the threshold information 31 is information that includes contents such as "item", "each region", and "overall".

The "item" is information that indicates contents of items of thresholds. The "each region" is information that indicates thresholds of each of target regions 200a to 200d to be mentioned later (see FIG. 5A). The "overall" is information that indicates thresholds of an overall monitored region R to be mentioned later (see FIG. 4). The thresholds of the items in the threshold information 31 are able to be previously obtained by an experiment and the like, for example.

For example, "luminance-average upper limit" of the item indicates a threshold that indicates an upper limit of a luminance average value. It is depicted that this threshold is "220" in the target regions 200a to 200d, and this threshold is "180" in the overall monitored region R.

In other words, as illustrated in FIG. 3, the threshold information 31 includes: information indicating thresholds of an upper limit and a lower limit of a luminance average;

and information indicating thresholds of an upper limit and a lower limit of a luminance standard deviation.

In FIG. 3, a range between the upper limit and the lower limit of the luminance average and a range between the upper limit and the lower limit of the luminance standard deviation of "overall" are narrower than those of "each region". Specifically, a range between the upper limit and the lower limit of the luminance average of "each region" is "160 (=220−60), on the other hand, that of "overall" is "90 (=180−90)".

This is because an area of the monitored region R is larger than that of each of the target regions 200a to 200d and thus a scattering of luminance values of pixels in the monitored region R is larger than that of each of the target regions 200a to 200d. Thus, it is possible to improve detection accuracy of the detection unit 23.

The control unit 2 divides the captured image into the plurality of regions 100, computes an average value or a standard deviation of luminance values for each of the target regions 200 corresponding to the one or more regions 100 of the divided regions 100, and detects the extraneous-matter region 300 on the basis of a computation result.

The dividing unit 21 divides a captured image, which is output from the image capturing device 10, into the plurality of regions 100. Processing details of the dividing unit 21 will be specifically explained with reference to FIG. 4.

FIG. 4 is a diagram illustrating processing details of the dividing unit 21 according to the embodiment. In FIG. 4, the captured image P is illustrated. The dividing unit 21 sets the monitored region R to be a target of a detection process from the captured image P. Specifically, the dividing unit 21 sets a coordinate position of one of vertices of the monitored region R and both of a width and a height of the monitored region R whose origin is the coordinate position of the one vertex.

For example, as illustrated in FIG. 4, the dividing unit 21 sets the monitored region R having a substantially-rectangular shape in a central region of the captured image P. In other words, the dividing unit 21 does not set the monitored region R in a region of an end part of the captured image P.

This is because the region of the end part of the captured image P is a region, such as a vehicle body of the own vehicle, space in the sky, etc., that does not affect the control system even when an extraneous matter adheres to the region. In this manner, it is possible to reduce a processing load by narrowing the monitored region R.

For example, when the region of the end part of the captured image P affects the control system, the region may be set to be the monitored region R.

Next, the dividing unit 21 divides the set monitored region R into the plurality of regions 100. For example, the dividing unit 21 divides the set monitored region R into the rectangular-shaped regions 100. Widths and heights of the regions 100 may be the same or different from one another. Each of the regions 100 may have a shape other than the rectangular shape and may have a circlar shape, for example.

Returning to FIG. 2, the computing unit 22 will be explained. The computing unit 22 detects luminance values of pixels included in each of the regions 100 divided by the dividing unit 21, and computes an average value and a standard deviation of luminance values of the target region 200 corresponding to the one or more regions 100. Processing details of the computing unit 22 will be specifically explained with reference to FIGS. 5A and 5B.

Figure 5A:
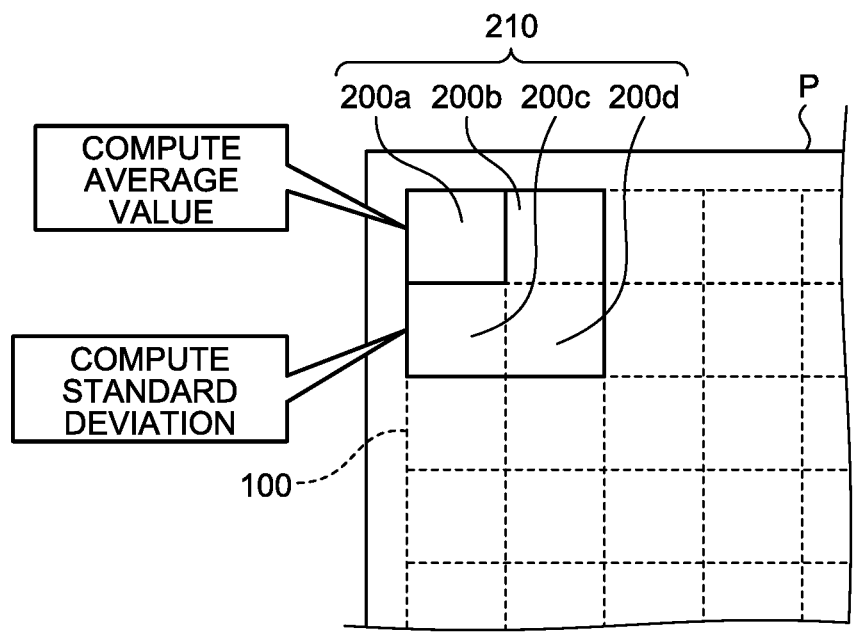
FIG. 5A is a diagram illustrating processing details of a computing unit according to the embodiment.
Figure 5B:
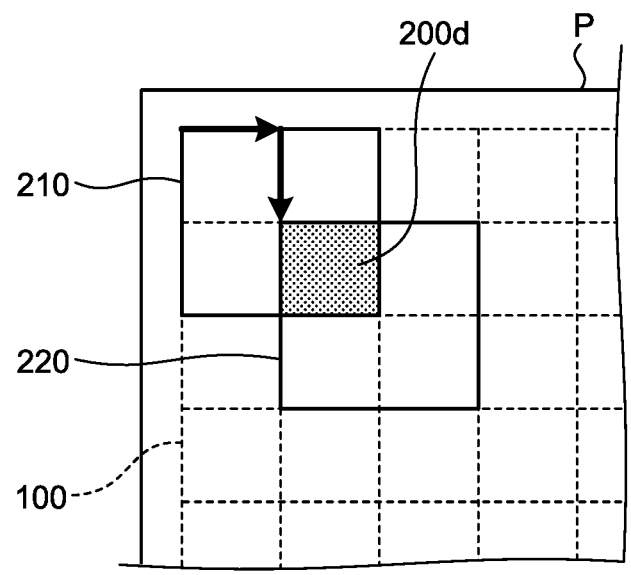
FIG. 5B is a diagram illustrating processing details of the computing unit according to the embodiment.

FIGS. 5A and 5B are diagrams illustrating processing details of the computing unit 22 according to the embodiment. In FIGS. 5A and 5B, the divided regions 100 are indicated by using dashed lines. The computing unit 22 sets the target regions 200a to 200d corresponding to the regions 100. Each of the target regions 200a to 200d is a region for computing an average value or a standard deviation of luminance values of pixels.

For example, as illustrated in FIG. 5A, the computing unit 22 sets the target regions 200a to 200d for the respective regions 100. The computing unit 22 may collectively set the regions 100 around the predetermined region 100 to be any one of the target regions 200a to 200d.

Next, as illustrated in FIG. 3, the computing unit 22 computes luminance average values of the target regions 200a to 200d. The computing unit 22 computes a luminance standard deviation on the basis of the target regions 200a to 200d.

Specifically, first, the computing unit 22 sets a connection region 210 obtained by connecting the target regions 200a to 200d for computing luminance average values. The computing unit 22 computes a standard deviation of the set connection region 210. In other words, the computing unit 22 sets the connection region 210 to be the target region 200 for computing a standard deviation.

In other words, an area of the connection region 210 for computing a standard deviation is four times as large as an area of each of the target regions 200a to 200d for computing average values. The area of the connection region 210 is explained to be four times as large as the area of each of the target regions 200a to 200d, but not limited thereto, the area of the connection region 210 may be another integer multiple of the area of the corresponding target region, moreover not limited to the integer multiple.

In other words, the computing unit 22 sets the area of the target region 200 for computing the standard deviation to be larger than the area of the target region 200 for computing the average value. This is because a scattering of luminance values is smaller as a region for computing a standard deviation is smaller, and thus difference between standard deviations of regions becomes small, so that it is impossible to distinguish the extraneous-matter region 300 from another region.

Thus, the computing unit 22 sets a region (the connection region 210) for computing a standard deviation to be large to some extent, and further sets each of the regions (the target regions 200a to 200d) for computing average values to be small to some extent, so that it is possible to realize improvement in the resolution of the extraneous-matter region 300 and prevention against erroneous detection.

Moreover, when the area of the connection region 210 is an integer multiple of the area of each of the target regions 200a to 200d, the operation is simplified, and thus the computing unit 22 is able to reduce a processing load of the control unit 2.

In the example illustrated in FIG. 5A, the connection region 210 is explained to be a 2-by-2 matrix, of the target regions 200a to 200d, having a substantially-square shape, the connection region 210 may have a portrait or landscape rectangular shape.

Next, the computing unit 22 further computes a standard deviation of a movement region 220 obtained by moving the connection region 210 so that a part of the movement region 220 overlaps with the connection region 210. This point will be specifically explained with reference to FIG. 5B.

In FIG. 5B, the connection region 210 and the movement region 220 are illustrated. As illustrated in FIG. 5B, the computing unit 22 moves the connection region 210 in the right direction by one cell (the one target region 200), and further moves the connection region 210 in the longitudinal direction by one cell (the one target region 200) so as to set the movement region 220.

In other words, the computing unit 22 moves the movement region 220 so that the movement region 220 overlaps with the connection region 210 by the one target region 200d included in the connection region 210. The computing unit 22 similarly moves the other connection region 210. In other words, the computing unit 22 moves the overall monitored region R (see FIG. 4) in the right direction by one cell, and further moves the overall monitored region R in the longitudinal direction by one cell.

The computing unit 22 is explained to set the movement region 220 having the one overlapped target region 200d, the movement region 220 may have the plurality of overlapped target regions 200; alternatively, the computing unit 22 may set the movement region 220 having an overlapped region of a part of the one target region 200d.

In other words, the computing unit 22 computes a standard deviation of the movement region 220 obtained by moving the connection region 210 so that the movement region 220 overlaps with the connection region 210 by at least a part of the target regions 200a to 200d included in the connection region 210.

Thus, the detection unit 23 to be mentioned later computes a final standard deviation in units of the size of the overlapped target region 200d to be able to improve the resolution of the extraneous-matter region 300.

Specifically, a logical disjunction between the connection region 210 and the movement region 220 is taken to be able to compute a final standard deviation in units of the size of the target region 200d, while preventing a case where an extraneous-matter region and another region are not distinguished by computing a standard deviation itself in units of the size of the connection region 210 or the movement region 220, so that it is possible to simultaneously realize improvement in the resolution and prevention against erroneous detection.

Moreover, the computing unit 22 sets the movement region 220 having the one overlapped target region 200d. In other words, by setting a region unit to be the same as that of the target region 200 for computing an average value, calculation in subsequent steps is simplified, so that it is possible to reduce a processing load of the control unit 2.

In the above explanation, a region for computing a standard deviation is explained to be the connection region 210 that is obtained by connecting a plurality of regions for computing average values, and a unit of a movement amount (in other words, movement amount of the movement region 220) for moving the connection region 210 is explained to be an integer multiple of the size of the region for computing the average value in the longitudinal direction and the lateral direction, not limited thereto.

For example, the region for computing the standard deviation may be set regardless of regions for computing average values, and the movement amount for moving may be arbitrary set within a range where there exists an overlapped region before and after the movement. Preferably, the movement amount in the longitudinal direction and that in the lateral direction may respectively be 1/M (M is integer number) times of the size of the region for computing the standard deviation in the longitudinal direction and the lateral direction. It is sufficient that a standard deviation is computed for each of the "M" movement regions 220 obtained by moving the target region 200 in the longitudinal direction or the lateral direction for "M" times, and a logical disjunction of "M" results is taken to compute a final standard deviation. In this case, it is possible to increase the resolution of a region for computing a standard deviation to "M" times as much as that of the original target regions.

Next, returning to FIG. 2, the detection unit 23 will be explained. The detection unit 23 detects the extraneous-matter region 300 and an abnormality region on the basis of a computation result of the computing unit 22. The abnormality region is a region that indicates an abnormality in the illuminance of lights being made incident on the image capturing device 10, and is a region that indicates a high luminance abnormality caused by irradiation of outside light (namely, backlight state) or a low illuminance abnormality in the nighttime and the like, for example. In other words, the abnormality region is a region caused by a halation or a black defect in the captured image P.

A detection method of an abnormality region performed by the detection unit 23 will be explained with reference to FIG. 6. FIG. 6 is a diagram illustrating processing details of the detection unit 23 according to the embodiment. The detection unit 23 detects, as an abnormality region, the target region 200a whose average value of luminance values computed by the computing unit 22 is out of a predetermined range.

Figure 6:
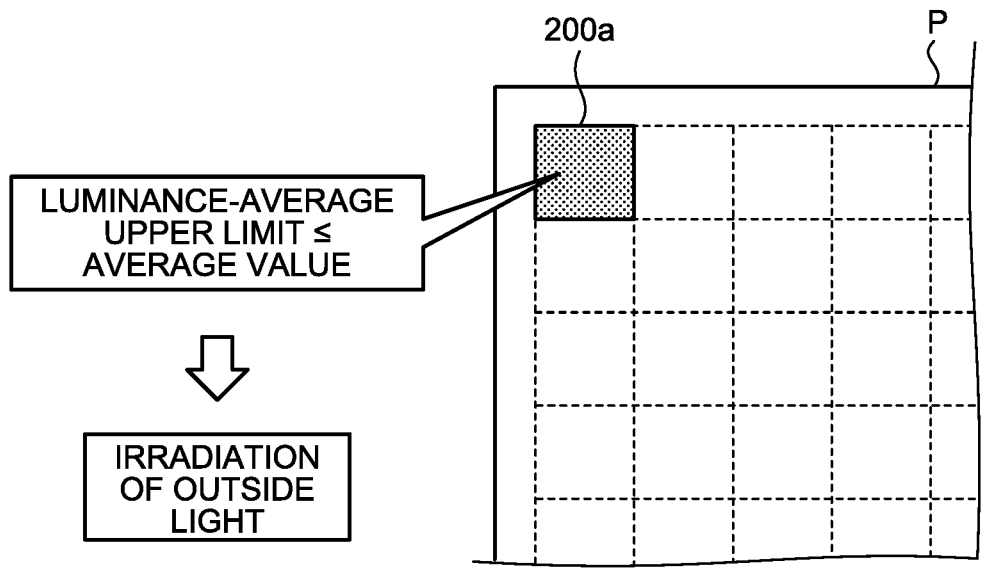
FIG. 6 is a diagram illustrating processing details of a detection unit according to the embodiment.

Specifically, as illustrated in FIG. 6, when the computed average value of the target region 200a is equal to or more than the "luminance-average upper limit" included in the threshold information 31, the detection unit 23 detects the target region 200a to be an abnormality region (halation region) caused by irradiation of outside light.

On the other hand, when the computed average value of the target region 200a is equal to or less than the "luminance-average lower limit" included in the threshold information 31, the detection unit 23 detects the target region 200a as an abnormality region (black defect region) caused by a low illuminance.

In this manner, the detection unit 23 detects a local abnormality in the luminance to be able to individually detect the extraneous-matter region 300 and the abnormality region. Thus, it is possible to prevent a case where the removal device 11 is uselessly operated, for example.

When detecting an abnormality region, the detection unit 23 transmits to the controller 12 information indicating a position of this abnormality region, and the controller 12 performs a control using regions without the abnormality region to be able to reduce a malfunction, for example.

Next, a detection method of the extraneous-matter region 300 performed by the detection unit 23 will be explained with reference to FIGS. 7 and 8. FIGS. 7 and 8 are diagrams illustrating processing details of the detection unit 23 according to the embodiment. In FIGS. 7 and 8, the target regions 200 and the connection regions 210, each of whose luminance average value or standard deviation is within a predetermined range, are colored.

The detection unit 23 extracts the target region 200 whose luminance average value and standard deviation computed by the computing unit 22 are within respective predetermined ranges so as to detect the extraneous-matter region 300. Specifically, the detection unit 23 extracts the target region 200 having an average value that is smaller than the "luminance-average upper limit" of the threshold information 31 and is larger than the "luminance-average lower limit". Next, the detection unit 23 extracts the connection region 210 having a standard deviation that is smaller than the "standard-deviation lower limit" of the threshold information 31.

Next, as illustrated in FIG. 7, the detection unit 23 takes a logical conjunction between the extracted target region 200 and the extracted connection region 210. In the example illustrated in FIG. 7, the target region 200 obtained by the logical conjunction is indicated by using color that is darker than that of the other target region 200. In this case, when the target regions 200 obtained by the logical conjunctions are adjacent to each other, the detection unit 23 detects the extraneous-matter region 300.

Specifically, when equal to or more than a predetermined number of the target regions 200 obtained by the logical conjunctions continue (may be in any of longitudinal direction and lateral direction), the detection unit 23 detects the continuous target regions 200 to be the extraneous-matter region 300. In other words, the detection unit 23 detects, as the extraneous-matter region 300, regions that satisfy AND conditions between the extracted target regions 200 and the extracted connection regions 210.

In this manner, the detection unit 23 sets blurred regions, which have luminance average values within a range between the thresholds and have low standard deviations, to be the extraneous-matter region 300 to be able to improve the detection accuracy. In other words, the detection unit 23 takes logical conjunctions between luminance average values and luminance standard deviations to be able not only to extract the extraneous-matter region 300 that accurately indicates a shape of an extraneous matter, but also to remove a noise region having no relation to the extraneous matter.

The detection unit 23 is explained to detect the extraneous-matter region 300 by taking the logical disjunctions between average values and standard deviations, may extract the target regions 200 on the basis of any one kind of the average values and standard deviations so as to detect the extraneous-matter region 300 when the extracted target regions 200 are adjacent to each other.

The detection unit 23 may detect the extraneous-matter region 300 in consideration of standard deviations of the movement regions 220, which are computed by the computing unit 22. This point will be explained with reference to FIG. 8.

In FIG. 8, a computation result of standard deviations in the connection regions 210 of a 4-by-6 matrix (24 regions in all) and those in the movement regions 220 of a 3-by-5 matrix (15 regions in all) are illustrated. Similarly to the aforementioned, colored regions have standard deviations that are smaller than the "standard-deviation lower limit" of the threshold information 31.

As illustrated in FIG. 8, the detection unit 23 extracts, as a total region (colored regions in middle part of FIG. 8) of standard deviations, regions indicated by logical disjunctions between the connection regions 210 and the movement regions 220 having standard deviations within a predetermined range. In the example illustrated in FIG. 8, the total region is constituted of a part of regions among the target regions 200 of an 8-by-12 matrix.

Next, the detection unit 23 detects the extraneous-matter region 300 on the basis of the target regions 200 whose total region and average values are computed. Specifically, as illustrated in FIG. 8, the detection unit 23 takes a logical conjunction between the target regions 200 of an 8-by-12 matrix including the total region and the target regions 200 of an 8-by-12 matrix including the target regions 200 extracted by using the average values, so as to detect the extraneous-matter region 300.

In other words, the detection unit 23 takes a logical disjunction to previously generate the total region using the movement regions 220 to be able to improve the resolution of the regions extracted by using standard deviations, so that it is possible to improve the resolution of the extraneous-matter region 300 to be detected.

In other words, it is possible to prevent, by the total region, a case where difference between standard deviations becomes small so as to detect the extraneous-matter region 300 that more accurately indicates a shape of an extraneous matter.

Next, with reference to FIG. 9, a procedure for detection processes to be executed by the extraneous-matter detecting apparatus 1 according to the embodiment will be explained. FIG. 9 is a flowchart illustrating the procedure for detection processes to be executed by the extraneous-matter detecting apparatus 1 according to the embodiment.

As illustrated in FIG. 9, the dividing unit 21 acquires the captured image P that is output from the image capturing device 10 (Step S101). Subsequently, the dividing unit 21 divides the acquired captured image P into the plurality of regions 100 (Step S102).

Next, the computing unit 22 computes average values and standard deviations of luminance values of the target regions 200 each of which is corresponding to the one or more regions 100 (Step S103). Next, the detection unit 23 determines whether or not the standard deviation of each of the target regions 200 (alternatively, the connection region 210), which is computed by the computing unit 22, is smaller than a lower limit of the threshold information 31 (Step S104).

When the corresponding standard deviation is smaller than the lower limit of the threshold information (Step S104: Yes), the detection unit 23 determines whether or not the average value of the corresponding target region 200 is within a range between thresholds of the threshold information 31 (Step S105).

When the average value is within the range between the thresholds of the threshold information 31 (Step S105: Yes), the detection unit 23 extracts this target region 200 that is within the range (Step S106). Specifically, extracts the one or more target regions 200 having standard deviations that are smaller than the lower limit of threshold and further having average values that are within the range between the thresholds.

The detection unit 23 determines whether or not the extracted target regions 200 are adjacent to each other (Step S107). When the extracted target regions 200 are adjacent to each other (Step S107: Yes), the detection unit 23 detects, as the extraneous-matter region 300, the plurality of adjacent target regions 200 (Step S108), and terminates the process.

On the other hand, in Step S104, when the standard deviation is equal to or more than the lower limit of threshold (Step S104: No), the detection unit 23 terminates the process.

In Step S105, when the average value is out of the range (Step S105: No), the detection unit 23 determines whether or not the average value is equal to or more than an upper limit (Step S109).

When the average value is equal to or more than the upper limit (Step S109: Yes), the detection unit 23 detects an abnormality due to irradiation of outside light in this target region 200, in other words, an abnormality region presenting a backlight state (Step S110).

On the other hand, in Step S109, when the average value is not equal to or more than the upper limit, in other words the average value is equal to or less than the lower limit (Step S109: No), the detection unit 23 detects an abnormality region in which this target region 200 presents an abnormality due to low illuminance (Step S111).

In Step S107, when the extracted target regions 200 are not adjacent to each other (Step S107: No), the detection unit 23 terminates the process.

As described above, the extraneous-matter detecting apparatus 1 according to the embodiment includes the dividing unit 21, the computing unit 22, and the detection unit 23. The dividing unit 21 divides the captured image P into the plurality of regions 100. The captured image P is output from the image capturing device 10. The computing unit 22 detects luminance values of pixels included in each of the plurality of regions 100 divided by the dividing unit 21, and computes, for each of the target regions 200, an average value or a standard deviation of luminance values of the detected luminance values. Each of the target regions 200 corresponds to one or more regions of the plurality of regions 100. The detection unit 23 extracts the target regions 200 having the average values or the standard deviations of the luminance values computed by the computing unit 22, which are within a predetermined range, and detects, when the extracted target regions 200 are adjacent to each other, the adjacent target regions 200 as the extraneous-matter region 300. The extraneous-matter region 300 is a region of the image capturing device 10 to which an extraneous matter is adhered. Thus, it is possible to improve detection accuracy of an extraneous matter.

In the above embodiment, the detection unit 23 is explained to detect the extraneous-matter region 300 by using the total region (see FIG. 8) obtained by taking one logical disjunction between the connection region 210 and the movement region 220, the logical disjunction may be taken a plurality of times.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An extraneous-matter detecting apparatus comprising:
    a processor programmed to:
        divide a captured image into a plurality of regions, the captured image being output from an image capturing device including an image sensor;
        detect luminance values of pixels included in each of the plurality of divided regions, and compute, for each of target regions, an average value or a standard deviation of luminance values of the detected luminance values, the corresponding target region corresponding to one or more regions of the plurality of regions;
        extract target regions having the computed average values or the computed standard deviations of the luminance values, which are within a predetermined range, and detect, when the extracted target regions are adjacent to each other, the adjacent target regions as an extraneous-matter region, the extraneous-matter region being a region of the image capturing device to which an extraneous matter is adhered; and
        set each of the target regions for computing the standard deviations to be larger than each of the target regions for computing the average values.

2. The extraneous-matter detecting apparatus according to claim 1, wherein
    the processor is further programmed to compute, for each of the target regions, the average value and the standard deviation of the luminance values, and
    the processor is further programmed to extract, from the target regions, a target region having the average value and the standard deviation of the luminance values that are within respective predetermined ranges so as to detect the extraneous-matter region, the computed average value and the computed standard deviation.

3. The extraneous-matter detecting apparatus according to claim 2, wherein
    the processor is further programmed to compute a standard deviation for each of movement regions obtained by moving the target region so that at least a part of the target region overlaps with the corresponding movement region, and
    the processor is further programmed to extract, as a total region of the standard deviations, a region indicated by a logical disjunction between one or more target regions of the target regions and one or more movement regions of the movement regions, the one or more target regions and one or more movement regions having standard deviations within the predetermined range.

4. The extraneous-matter detecting apparatus according to claim 3, wherein
    a movement amount unit of the target region in longitudinal and lateral directions is 1/M (M is integer number) times of respective longitudinal and lateral widths of the target region, and
    the processor is further programmed to take M logical disjunctions based on M standard deviations computed while moving the target region M times, so as to extract the total region.

5. The extraneous-matter detecting apparatus according to claim 1, wherein
    the processor is further programmed to compute a standard deviation for each of movement regions obtained by moving the target region so that at least a part of the target region overlaps with the corresponding movement region, and
    the processor is further programmed to extract, as a total region of the standard deviations, a region indicated by a logical disjunction between one or more target regions of the target regions and one or more movement regions of the movement regions, the one or more target regions and one or more movement regions having standard deviations within the predetermined range.

6. The extraneous-matter detecting apparatus according to claim 5, wherein
    a movement amount unit of the target region in longitudinal and lateral directions is 1/M (M is integer number) times of respective longitudinal and lateral widths of the target region, and
    the processor is further programmed to take M logical disjunctions based on M standard deviations computed while moving the target region M times, so as to extract the total region.

7. The extraneous-matter detecting apparatus according to claim 1, wherein the processor is further programmed to set a connection region to be the target region for computing the standard deviation, the connection region being obtained by connecting the target regions for computing the average values.

8. The extraneous-matter detecting apparatus according to claim 7, wherein
    the processor is further programmed to compute a standard deviation of a movement region obtained by moving the connection region so that the moved connection region overlaps with at least a part of the plurality of target regions included in the connection region, and the processor is further programmed to extract, as a total region of the standard deviations, a region indicated by a logical disjunction between the connection region and the movement region having the standard deviations within the predetermined range, and detects the extraneous-matter region based on the total region and the one or more target regions for computing the average values.

9. The extraneous-matter detecting apparatus according to claim 8, wherein the processor is further programmed to move the movement region so that the movement region overlaps with one target region of the target regions included in the connection region.

10. An extraneous-matter detecting apparatus comprising:
a processor programmed to:
divide a captured image into a plurality of regions, the captured image being output from an image capturing device including an image sensor;
detect luminance values of pixels included in each of the plurality of divided regions, and compute, for each of target regions, an average value or a standard deviation of luminance values of the detected luminance values, the corresponding target region corresponding to one or more regions of the plurality of regions;
extract target regions having the computed average values or the computed standard deviations of the luminance values, which are within a predetermined range, and detect, when the extracted target regions are adjacent to each other, the adjacent target regions as an extraneous-matter region, the extraneous-matter region being a region of the image capturing device to which an extraneous matter is adhered;
compute a standard deviation for each of movement regions obtained by moving the target region so that at least a part of the target region overlaps with the corresponding movement region, andregion; and extract, as a total region of the standard deviations, a region indicated by a logical disjunction between one or more target regions of the target regions and one or more movement regions of the movement regions, the one or more target regions and one or more movement regions having standard deviations within the predetermined range.

11. The extraneous-matter detecting apparatus according to claim 10, wherein
a movement amount unit of the target region in longitudinal and lateral directions is 1/M (M is integer number) times of respective longitudinal and lateral widths of the target region, and
the processor is further programmed to take M logical disjunctions based on M standard deviations computed while moving the target region M times, so as to extract the total region.

12. An extraneous-matter detecting method comprising:
dividing a captured image into a plurality of regions, the captured image being output from an image capturing device including an image sensor;
detecting luminance values of pixels included in each of the plurality of regions divided in the dividing, and computing, for each of target regions, an average value or a standard deviation of luminance values of the detected luminance values, the corresponding target region corresponding to one or more regions of the plurality of regions; and
extracting target regions having the average values or the standard deviations of the luminance values computed in the computing, which are within a predetermined range, and detecting, when the extracted target regions are adjacent to each other, the adjacent target regions as an extraneous-matter region, the extraneous-matter region being a region of the image capturing device to which an extraneous matter is adhered; and
setting each of the target regions for computing the standard deviations to be larger than each of the target regions for computing the average values.

* * * * *